(12) United States Patent
Luik et al.

(10) Patent No.: US 6,808,451 B2
(45) Date of Patent: Oct. 26, 2004

(54) AIR FLOW ARRANGEMENT

(75) Inventors: Klaus Luik, Muehlacker (DE); Olaf Benkler, Neuhausen/Hamberg (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 47 days.

(21) Appl. No.: 10/233,488

(22) Filed: Sep. 4, 2002

(65) Prior Publication Data

US 2003/0054750 A1 Mar. 20, 2003

(30) Foreign Application Priority Data

Sep. 4, 2001 (DE) .......................................... 101 43 262

(51) Int. Cl.$^7$ ................................................. B60H 1/34
(52) U.S. Cl. ..................... 454/155; 454/315; 454/318; 454/320; 454/322
(58) Field of Search ................................ 454/155, 202, 454/315, 318, 319, 320, 322, 327, 333

(56) References Cited

U.S. PATENT DOCUMENTS

| | | | | |
|---|---|---|---|---|
| 4,887,520 A | * | 12/1989 | Bauer | ........................ 454/155 |
| 6,059,652 A | * | 5/2000 | Terry et al. | ................. 454/155 |
| 6,131,336 A | | 10/2000 | Krause et al. | ............... 49/74.1 |
| 2003/0100256 A1 | * | 5/2003 | Nishimori et al. | .......... 454/155 |
| 2003/0211821 A1 | * | 11/2003 | Driller | ........................ 454/124 |

FOREIGN PATENT DOCUMENTS

| | | | | |
|---|---|---|---|---|
| DE | 43 27 265 | 8/1993 | | |
| DE | 197 28 305 | 10/2000 | | |
| EP | 0 397 909 | * 11/1990 | ................. | 454/155 |
| EP | 0630773 | 12/1994 | | |
| EP | 0888916 | 1/1999 | | |
| FR | 2775221 | 8/1999 | | |
| JP | 57-151410 | * 9/1982 | ................. | 454/155 |
| WO | 02/36372 | 5/2002 | | |

OTHER PUBLICATIONS

European Search Report.

* cited by examiner

Primary Examiner—Harold Joyce
(74) Attorney, Agent, or Firm—Crowell & Moring LLP

(57) ABSTRACT

An air flow control arrangement is constructed with an air feed into an interior of a motor vehicle. Vertical and horizontal air guiding vanes are swivelably arranged in a housing, and controllable by way of an adjusting device. The housing can be fastened in an opening of a column paneling. The housing has a vertically aligned air guiding duct that includes a first lower duct section with an adjusting flap which can be swiveled about a bearing axis into a horizontal closed position, a vertical open position and intermediate positions, and a second adjoining upper duct section with the integrated air guiding vanes. The adjusting flap can be operated by means of the operating element via a reversing bow which is connected with a crank of the flap and can be swiveled at the housing in a bearing. The housing is fastened by detent hooks which can be snapped onto edges of the column paneling. Furthermore, a retaining spring fastens the head side of the housing.

6 Claims, 5 Drawing Sheets

AIR FLOW ARRANGEMENT

BACKGROUND AND SUMMARY OF THE INVENTION

This application claims the priority of German patent document 101 43 262.3, filed Sep. 4, 2001, the disclosure of which is expressly incorporated by reference herein.

The invention relates to an air flow arrangement for controlling a flow of air into an interior of a motor vehicle.

German Patent Document DE 43 27 265 C2 discloses a side nozzle for ventilating the interior of a vehicle, which comprises transverse and longitudinal vanes in the nozzle inlet area which can be swiveled relative to one another in a housing. In the housing, a swivelable, air-quantity regulating flap is provided which, in a closed position, is vertically arranged in the horizontally aligned air duct.

It is an object of the present invention to provide an improved air flow arrangement which permits a targeted feeding of air into the interior of a vehicle.

Another object of the invention is to provide such an air flow arrangement that requires little space for its installation in a vehicle column;

Finally, still another object of the invention is to provide an air flow arrangement that can be inserted and fastened in a simple manner in a column paneling.

These and other objects and advantages are achieved by the air flow arrangement according to the invention which provides a targeted flow of air into the interior of the vehicle even in a closed position. By way of an air flap in the air guiding housing, the air to be fed to the interior can be regulated corresponding to an open and closed position as well as a half-open position. For this purpose, the housing has a vertically aligned air guiding duct in the vehicle column. This air guiding duct consists of a first lower duct section with an adjusting flap that can be swiveled by means of an operating element about a bearing axis into a horizontal closed position, a vertical open position and an intermediate position. This first duct section is followed by a second upper duct section with the integrated air guiding vanes. The adjusting flap in the lower duct section is operable by means of the operating element and a reversing bow which is connected with a crank of the flap. The adjusting flap can be swiveled on the housing in a bearing.

The air flow direction is controlled by way of the positions of the air guiding vanes, the vertically set air guiding vanes being composed of a first vane unit arranged in a perpendicular transverse vehicle plane, and a second vane unit arranged offset thereto by approximately 90° in a vertical longitudinal vehicle plane. By way of an adjusting element, all vanes are moved jointly into an open position. In a closed position, the first vane unit takes up an open position and the second vane unit will then be closed.

As a result, in a closed position of the vertically aligned air guiding vanes, for example, air can flow against the side window of the vehicle, while the other air guiding vane, which are arranged directly in the transverse direction of the vehicle, have a closed position.

In particular, the first vane unit has a single stationary vane in an open position which is arranged directly adjacent to a housing wall of the air outlet opening and cannot be controlled in the case of an open and closed position. As a result, a flow against the side windows is achieved in any position of the vertical air guiding vanes.

The operating element for the adjusting flap is connected by way of a pin/fork connection with the reversing bow, and the which can be adjusted about its axis for operating the flap in at least three positions, such as an open position, a closed position and an intermediate position. To fix these positions, the operating element is equipped on its underside with a spring-loaded sleeve element which in a clamping manner engages in detent grooves at the housing corresponding to these positions.

As a result, in the vertically aligned air duct formed by the housing, a feeding of air into the interior can be controlled corresponding to the flap position. The individual positions of the flap by way of the detent grooves are constructed as so-called detent positions.

For a simple fastening of the housing in the paneling of the vehicle column, several detent hooks provided at the vertical edges of the housing receive the edge of the paneling between one another. Furthermore, a retaining spring held in a clamped-in manner at the head side of the housing in a housing receiving device is supported by a leg on an edge of the paneling, with an edge of the housing reaching over the edge on the opposite side.

Since the housing (and therefore the air duct) extends vertically in the vehicle column, little installation space is required in the transverse direction and the already existing installation space in the vertical direction can be fully utilized.

For illuminating the operating element for the air flap, which is constructed, for example, as a knurled wheel, a socket for a light-emitting diode is provided in the bearing axis of the operating element. The light-emitting diode generates a light beam from the inside toward the outside of the operating element.

Other objects, advantages and novel features of the present invention will become apparent from the following detailed description of the invention when considered in conjunction with the accompanying drawings.

DETAILED DESCRIPTION OF THE INVENTION

Figure 1:
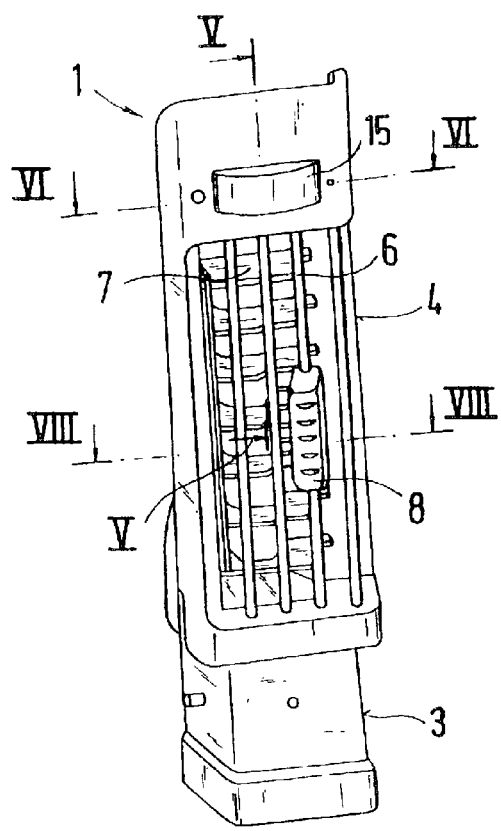
FIG. 1 is a frontal view of the air flow arrangement in the uninstalled state.
Figure 2:
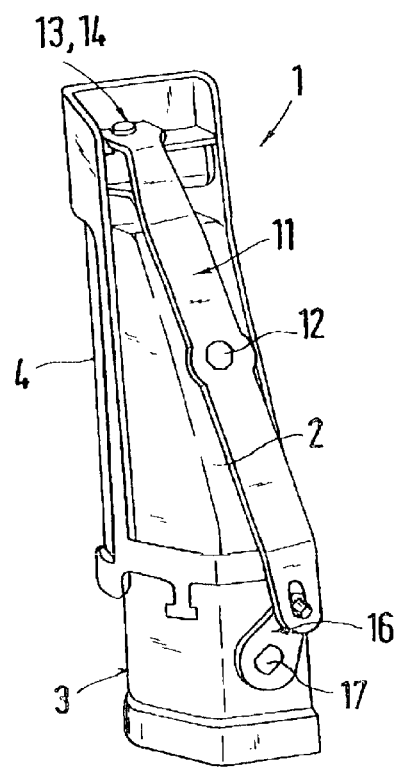
FIG. 2 is a rear view of the air flow arrangement with a swivelable reversing bow.

As shown in FIGS. 1 and 2, the air flow arrangement 1 comprises essentially a housing 2 which forms a vertically oriented air guiding duct which is composed of a first (lower) duct section 3 and a second adjoining (upper) duct section 4.

Figure 4:
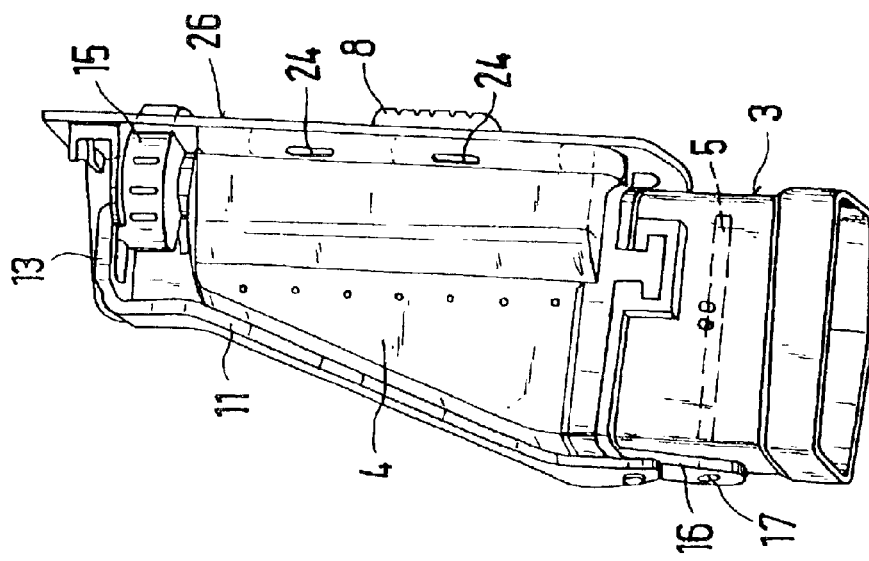
FIG. 4 is a lateral view of the air flow arrangement.
Figure 3:
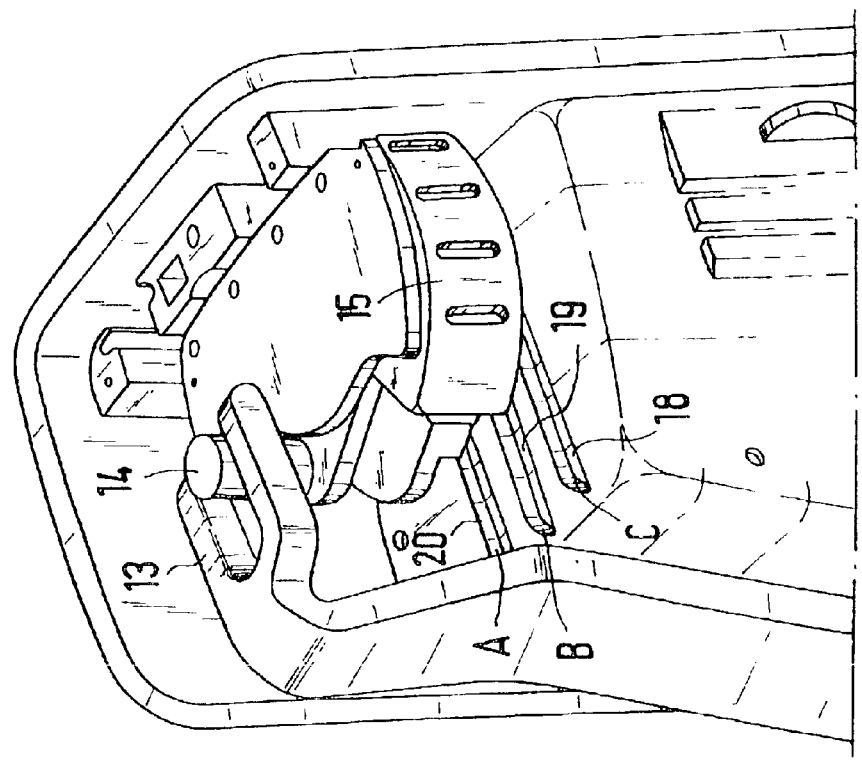
FIG. 3 is a detail view of a portion of the operating element and the reversing bow.

Inside the housing 2, an adjusting flap 5 (FIGS. 4 and 9) arranged in the first duct section 3 is adjustable into different positions. The vertical and horizontal air guiding vanes 6, 6a and 7 arranged in the second duct section are adjustable into different positions while the air guiding vanes 6b are stationary.

The vertically disposed air guiding vanes 6, 6a consist of a first vane unit L1 arranged in a perpendicular transverse plane X—X, and another vane unit L2 arranged approximately in a perpendicular longitudinal plane Y—Y of the vehicle. (See FIG. 7.) These vane units L1 and L2 are adjusted by means of an adjusting element 8 which is disposed on an air guiding vane 6.

The vane units L1 and L2 (FIG. 7) with the vanes 6 and 6a take up an open and closed position D and E as well as one or several intermediate positions thereto. In the open position D, the vanes 6, 6a are indicated by broken lines; and in the closed position E, they are indicated by solid lines (FIG. 8).

Figure 7:
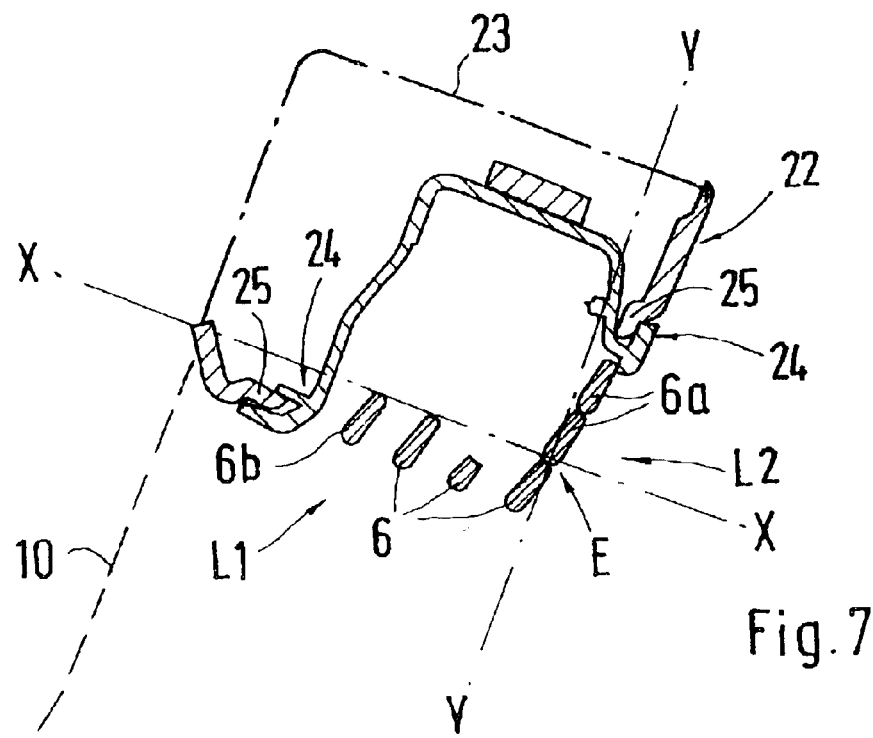
FIG. 7 is a horizontal sectional view of the housing of the arrangement inserted into the paneling of the column.
Figure 8:
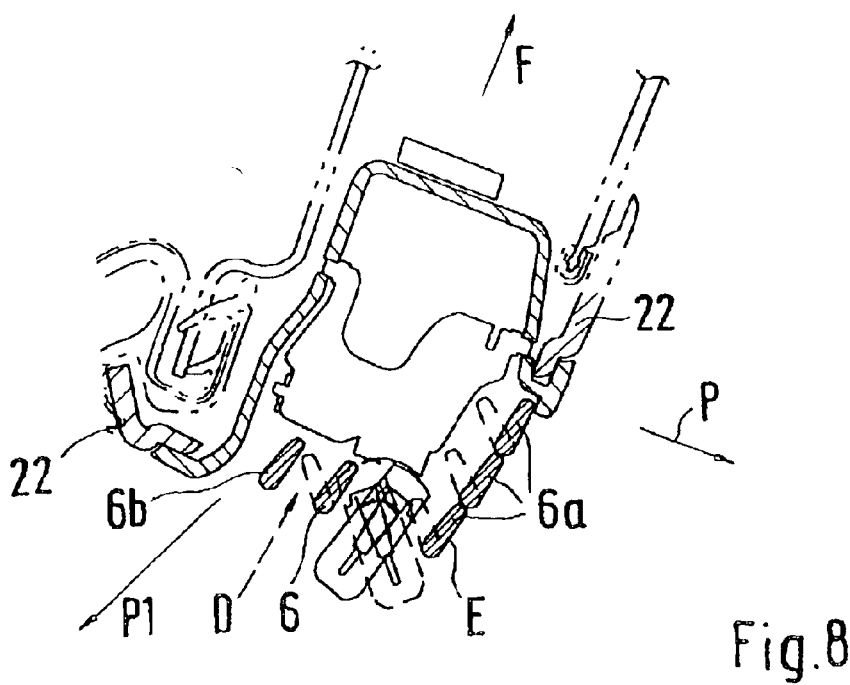
FIG. 8 is a horizontal sectional view of the inserted housing of the air flow arrangement, along Line VIII—VIII of FIG. 1, with differently illustrated positions of the air guiding vanes.

As illustrated in detail in FIG. 7, in the closed position E, the vanes 6a of unit L2 are all closed; that is, the air flow transversely to the interior in the direction of the arrow P of the vehicle is blocked (FIG. 8). In contrast, the vanes 6 of unit L1 are all open. Corresponding intermediate positions of vanes 6 and 6a are possible.

The vane 6b is stationarily arranged in the housing 2; that is, independently of the adjustments of the other vanes 6 and 6a, this vane 6b is always in an open position, so that an air flow in the direction of the arrow P1 can constantly sweep over a side window 10 of the vehicle (FIG. 8).

Figure 9:
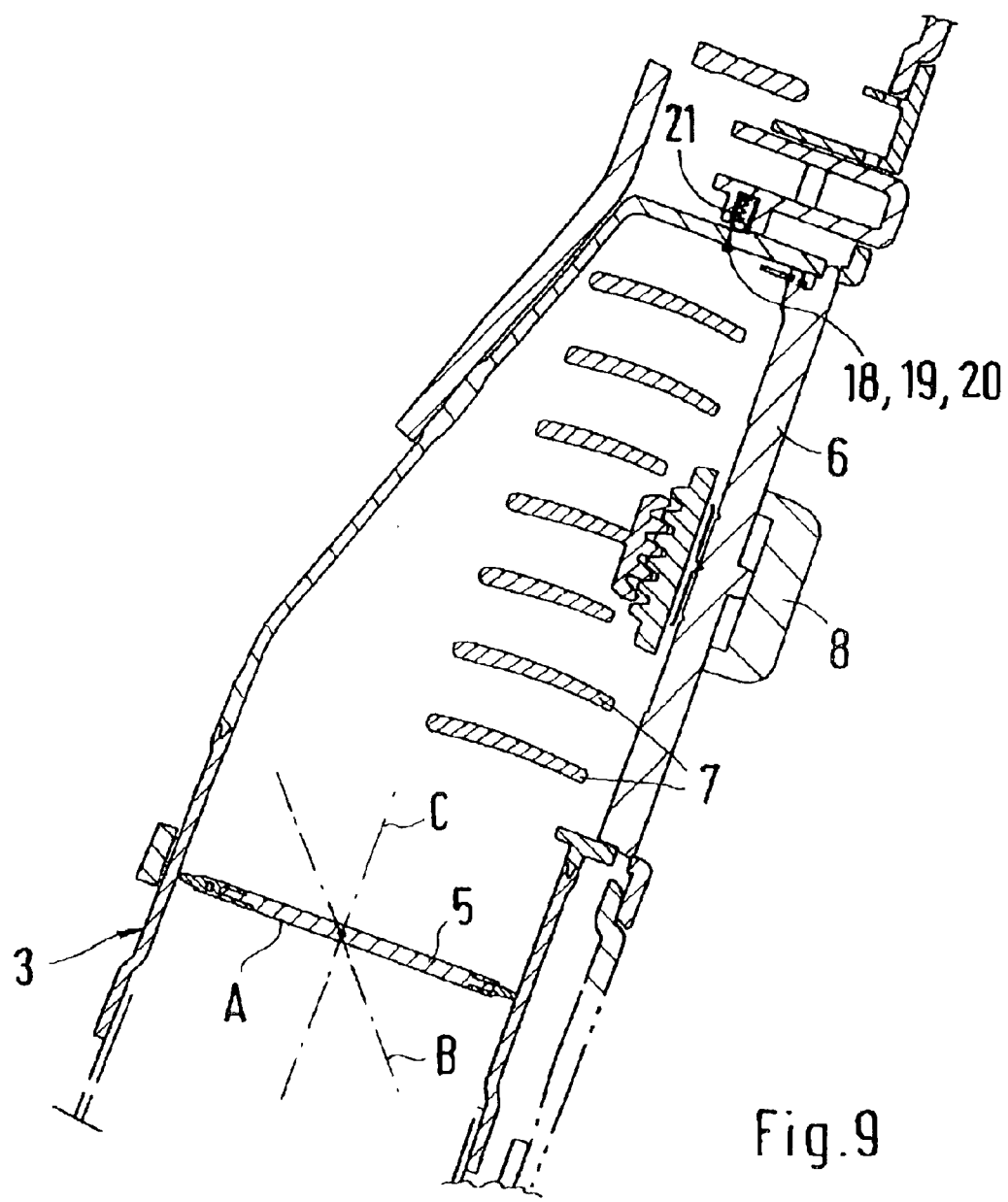
FIG. 9 is a horizontal sectional view of the housing with the air flap and horizontally set air guiding vanes.

The vertically set air guiding vanes 6 and 6a as well as the horizontal air guiding vanes 7 are adjusted by way of the adjusting element 8, which is coupled to the horizontal air guiding vanes by a rack and pinion sear arrangement 21, as shown in FIG. 9.

The adjusting flap 5 in the lower duct 3 is operated by way of a reversing bow 11. As best seen in FIG. 2, this reversing bow 11 can be swiveled about a bearing axis 12 on the rearward side of the housing 2. Together with the flap 5, the reversing bow 11 is held by means of a fork piece 13 on a pin 14 of the operating element 15, so that when the latter is rotated, the reversing bow 11 is swiveled. By means of a connection with the flap 5 via a crank 16 and by way of a swiveling axis 17 on the flap 5, the flap 5 can be adjusted to an open and closed position A and B as well as to an intermediate position C. The positions A,B and C are detent positions formed by a sleeve 21 prestressed in grooves 18, 19 and 20, by means of a spring (FIG. 9).

Figure 5:
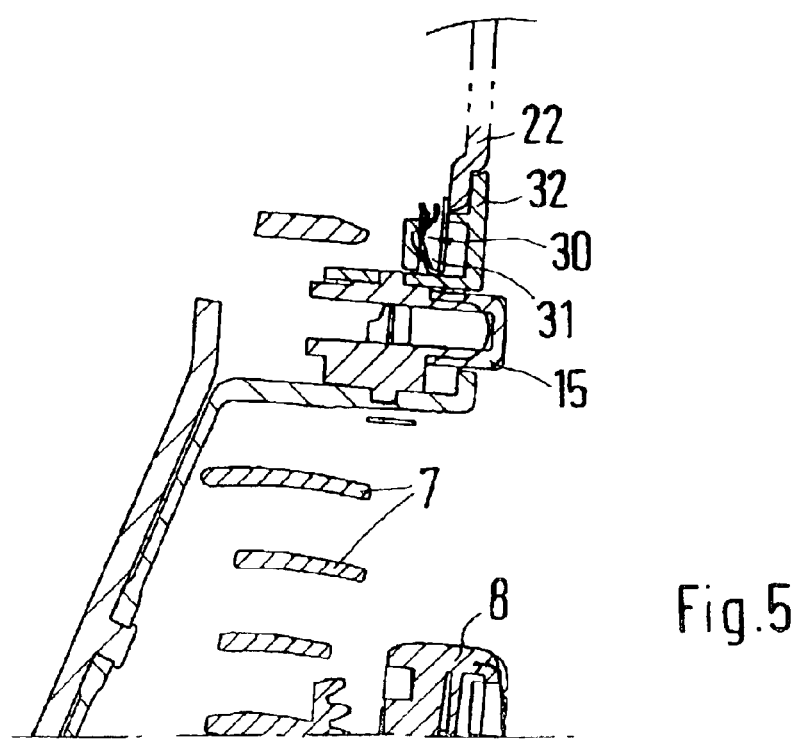
FIG. 5 is a vertical sectional view of the air flow arrangement according to Line V—V of FIG. 1.

For fastening the housing 2 in an opening of a paneling part 22 of a vehicle column 23, particularly a B-column of the vehicle, detent hooks 24 are provided on projecting housing edges which can be snapped onto edges 25 of the paneling 22 (FIG. 7). Furthermore, for fixing the housing 2 in the opening of the paneling 22, a retaining spring 30 (FIG. 5) can be inserted at the head of the housing 2 into a housing recess 31. The retaining spring 30 receives and clamps the edge of the paneling 22 between itself and a housing edge 33.

Figure 6:
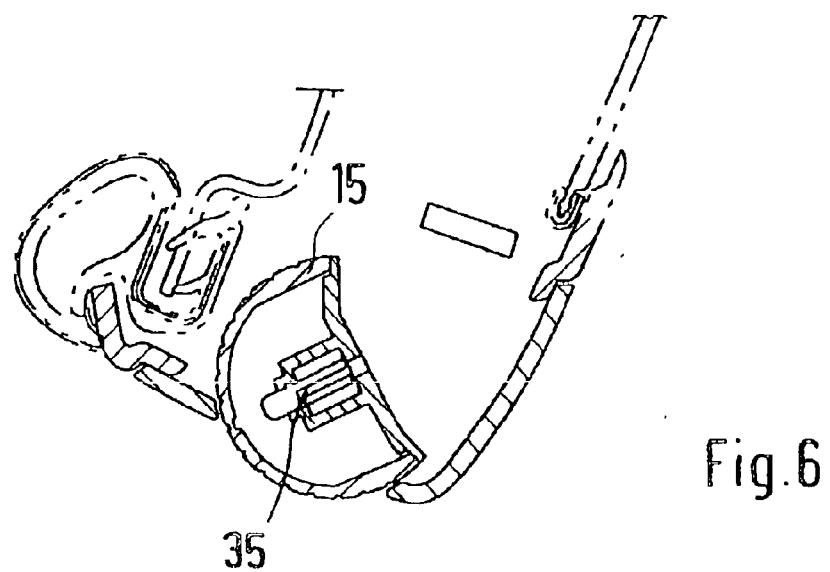
FIG. 6 is a horizontal sectional view of the air flow arrangement according to Line VI—VI of FIG. 1.

For illuminating the operating element 15 for the flap 5 in the air duct, a light-emitting diode 35 (FIG. 6) is arranged in the air duct. The light-emitting diode illuminates the operating element 15 while shining through from the inside.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air flow arrangement for feeding air to an interior of a motor vehicle, comprising:

a housing;

vertical and horizontal air guiding vanes swivelably arranged in the housing; and an adjusting element for controlling swiveling of the vanes; wherein, the housing is fastenable in an opening of a column paneling that is connectable with a column of the vehicle;

the housing has a vertically aligned air guiding duct in the vehicle column;

the air guiding duct includes lower and upper duct sections;

the lower duct section has an adjusting flap that can be swiveled by means of an operating element about a bearing axis into a horizontal closed position, a vertical open position and an intermediate position;

the adjusting flap can be operated via the operating element, by way of a reversing bow that is connected with a crank of the flap and can be swiveled at the housing in a bearing;

the upper duct section includes the vertical and horizontal air guiding vanes;

the vertical air guiding vanes are composed of a first vane unit which is arranged in a perpendicular transverse plane of the vehicle and includes a plurality of air guiding vanes that are swivelable about a longitudinal axis thereof, and a second vane unit which is arranged approximately perpendicular to the first vane unit in a vertical longitudinal plane of the vehicle and includes a plurality of air guiding vanes that are swivelable about a longitudinal axis thereof;

by way of said adjusting element all swivelable vanes can be jointly moved into a first position in which all of said swivelable vertical air guiding vanes are in an open position, and a second position, in which the swivelable vertical air guiding vanes of the first vane unit take up an open position and the swivelable vertical air guiding vanes of the second vane unit take up a closed position;

the first vane unit includes a single stationary vane which is fixed in an open position, is arranged directly adjacent to a housing wall of the air outlet opening and cannot be swiveled into an open or closed position;

the horizontal air guiding vanes are disposed in said upper duct section upstream of said vertical air guiding vanes and are swivelable about respective longitudinal axis thereof; and said adjusting element is mounted on one of said swivelable vertical air guiding vanes in said first vane unit, and is coupled to one of said horizontal air guiding vanes via a rack and pinion gear device.

2. The air flow arrangement according to claim 1, wherein:

the operating element is connected with the reversing bow via a pin/fork connection; and the reversing bow can be adjusted about its bearing axis for operating the adjusting flap into at least three positions, including an open position, a closed position and an intermediate position; and for fixing the positions, the operating element has on its underside a spring-loaded sleeve element which, in a clamping manner, engages in detent grooves at the housing corresponding to the respective positions.

3. The air flow arrangement according to claim 1, wherein for fastening in the column paneling, the housing has a plurality of detent hooks on vertical edges thereof, and has a housing receiving device for a retaining spring in an upper head area thereof.

4. The air flow arrangement according to claim 3, wherein:

the retaining spring is held in the housing receiving device in a clamped-in manner; and the retaining spring receives an edge section of the column paneling between itself and a housing wall.

5. The air flow arrangement according to claim 1, further comprising a receiving device for a light-emitting diode arranged in the bearing axis of the operating element, which light-emitting diode generates a light beam from inside the housing to outside the housing, onto the operating element.

6. The air flow arrangement according to claim 1, wherein the number of openings between air guiding vanes of said first vane unit in said second position is greater than the number of vanes in the second vane unit.

* * * * *